United States Patent
Cho et al.

(10) Patent No.: US 12,019,822 B2
(45) Date of Patent: Jun. 25, 2024

(54) DISPLAY DEVICE HAVING A BLOCKING PART COVERING SENSING WIRINGS

(71) Applicant: Samsung Display Co., Ltd., Yongin-si (KR)

(72) Inventors: Hyun-Wook Cho, Seongnam-si (KR); Min-Hong Kim, Hwaseong-si (KR); Taejoon Kim, Seongnam-si (KR); Jungmok Park, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/095,530

(22) Filed: Jan. 10, 2023

(65) Prior Publication Data

US 2023/0161436 A1    May 25, 2023

Related U.S. Application Data

(63) Continuation of application No. 17/172,062, filed on Feb. 9, 2021, now Pat. No. 11,567,605.

(30) Foreign Application Priority Data

Apr. 13, 2020 (KR) ........................ 10-2020-0044861

(51) Int. Cl.
*G06F 3/041* (2006.01)
*G06F 3/044* (2006.01)

(52) U.S. Cl.
CPC ........ *G06F 3/04162* (2019.05); *G06F 3/0446* (2019.05); *G06F 3/0412* (2013.01); *G06F 2203/04107* (2013.01)

(58) Field of Classification Search
CPC .. G06F 3/0412; G06F 3/04162; G06F 3/0446; G06F 2203/04107
See application file for complete search history.

(56) References Cited

U.S. PATENT DOCUMENTS

| | | |
|---|---|---|
| 9,990,009 B2 | 6/2018 | Ham et al. |
| 10,241,597 B2 | 3/2019 | Jung et al. |
| 10,379,641 B2 | 8/2019 | Lim et al. |

(Continued)

FOREIGN PATENT DOCUMENTS

| | | |
|---|---|---|
| EP | 3226109 | 10/2017 |
| JP | 2014071863 | 4/2014 |

(Continued)

OTHER PUBLICATIONS

Non-Final Office Action dated Feb. 2, 2022, in U.S. Appl. No. 17/172,062.

(Continued)

*Primary Examiner* — Lisa S Landis
(74) *Attorney, Agent, or Firm* — Lewis Roca Rothgerber Christie LLP

(57) ABSTRACT

A display device includes: a display panel; and an input sensor disposed on the display panel, wherein the input sensor includes: a plurality of sensing electrodes; a plurality of sensing wirings electrically connected to the plurality of sensing electrodes, respectively; and a conductive part covering the plurality of sensing wirings, wherein the conductive part is configured to be floated or to receive a substantially constant voltage, and wherein the conductive part has a single, contiguous shape.

17 Claims, 12 Drawing Sheets

(56) References Cited

U.S. PATENT DOCUMENTS

| | | | |
|---|---|---|---|
| 2013/0033450 A1 | 2/2013 | Coulson et al. | |
| 2013/0141380 A1* | 6/2013 | Wang | G06F 3/0443 |
| | | | 345/173 |
| 2018/0018053 A1* | 1/2018 | No | G06F 3/0446 |
| 2018/0252955 A1* | 9/2018 | Kurasawa | G06F 3/0443 |
| 2019/0042018 A1* | 2/2019 | Kim | G06F 3/044 |

FOREIGN PATENT DOCUMENTS

| | | |
|---|---|---|
| KR | 10-2017-0079884 | 7/2017 |
| KR | 10-2018-0007388 | 1/2018 |
| KR | 10-2018-0008968 | 1/2018 |
| KR | 10-2019-0014930 | 2/2019 |

OTHER PUBLICATIONS

Final Office Action dated Jul. 7, 2022, in U.S. Appl. No. 17/172,062.
Notice of Allowance dated Sep. 27, 2022, in U.S. Appl. No. 17/172,062.

* cited by examiner

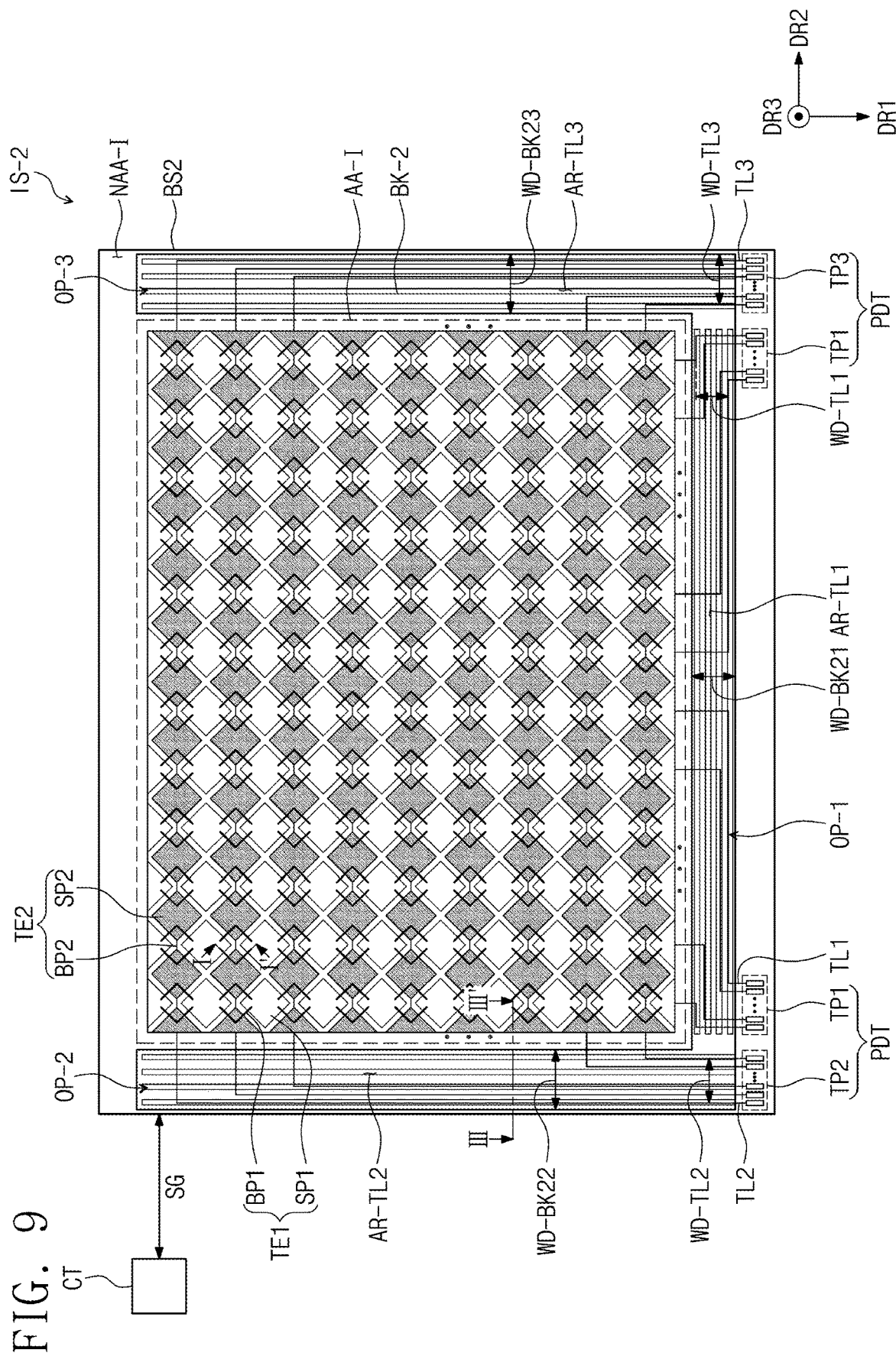

DISPLAY DEVICE HAVING A BLOCKING PART COVERING SENSING WIRINGS

CROSS-REFERENCE TO RELATED APPLICATIONS

This application is a Continuation of U.S. patent application Ser. No. 17/172,062, filed on Feb. 9, 2021, which claims priority from and the benefit of Korean Patent Application No. 10-2020-0044861, filed on Apr. 13, 2020, each of which is hereby incorporated by reference for all purposes as if fully set forth herein.

BACKGROUND

Field

Implementations of the invention relate generally to a display device and, more specifically, to an input sensor included in the display device having a blocking member to improve sensing reliability.

Discussion of the Background

Electronic devices such as a smartphone, a tablet, a laptop computer, and a smart television are being developed. These electronic devices include a display device for providing information.

Recently, display devices may include an input sensor capable of interacting with a user in addition to displaying an image through a display panel. The input sensor determines whether an object touches a screen and its touch coordinates when a user contacts or approaches the screen using his/her finger, a sensing pen, etc. The display devices may receive an image signal based on the touch coordinates.

The above information disclosed in this Background section is only for understanding of the background of the inventive concepts, and, therefore, it may contain information that does not constitute prior art.

SUMMARY

Applicant realized that an electric field between an input device (e.g., a sensing pen) and sensing wirings in the input senor can distort signals transmitted through the sensing wirings.

Display devices constructed according to the principles and embodiments of the invention are capable of improving sensing reliability of an input sensor included in the display panel by having a blocking part disposed on the sensing wirings to prevent an electric field from being generated between the input device and the sensing wirings. Further, the blocking part can also prevent a signal transmitted through the sensing wirings from being distorted by the input device.

Additional features of the inventive concepts will be set forth in the description which follows, and in part will be apparent from the description, or may be learned by practice of the inventive concepts.

According to one aspect of the invention, a display device includes: a display panel and an input sensor disposed on the display panel and configured operable in a first mode and a second mode different from the first mode, wherein the input sensor may include a plurality of sensing electrodes, a plurality of sensing wirings electrically connected to the plurality of sensing electrodes, respectively, and a blocking part covering the plurality of sensing wirings. The blocking part is configured to be floated in the first mode and to receive a substantially constant voltage in the second mode.

The blocking part may include a shielding layer having a mesh pattern.

A plurality of openings may be defined in the blocking part, the plurality of openings may be spaced apart in a first direction, and the plurality of openings may extend in a second direction crossing the first direction, respectively.

Each of the plurality of openings may have a width greater than a width of each of the plurality of sensing wirings.

The display device may further include a controller to receive a signal from the input sensor and to remove the signal when the signal has a shape different from a shape of a Gaussian distribution.

The substantially constant voltage may be a ground voltage.

The substantially constant voltage may be substantially the same as a voltage provided to the plurality of sensing electrodes.

In the second mode, the plurality of sensing wirings and the blocking part are configured to receive substantially the same voltage.

The plurality of sensing electrodes may include a plurality of sensing patterns and a bridge pattern disposed on a layer different from the plurality of sensing patterns, the plurality of sensing wirings disposed on the same layer as any one of the plurality of sensing patterns or the bridge pattern, and the blocking part may be disposed on the same layer as the other of the plurality of sensing patterns or the bridge pattern.

The plurality of sensing electrodes may include a plurality of first sensing electrodes and a plurality of second sensing electrodes. In the first mode, the plurality of first sensing electrodes may be configured to output sensing signals and the plurality of second sensing electrodes may be configured to receive driving signals in the first mode, and in the second mode, the plurality of first and second sensing electrodes are configured to receive the same substantially constant voltage.

The input sensor may be configured to be operated in a capacitive type in the first mode, and may be configured to be operated to sense an electrostatic signal in the second mode.

The blocking part may have a width in the first direction may be greater than a width of a wiring region, where the plurality of sensing wirings extending in the second direction intersecting the first direction are disposed, in the first direction.

An area of the blocking part may be larger than an area of the wiring region.

According to another aspect of the invention, a display device includes a display panel, a plurality of sensing electrodes disposed on the display panel, a plurality of sensing wirings electrically connected to the plurality of sensing electrodes, respectively, and a blocking part disposed on the plurality of sensing wirings and having a width in a first direction greater than a width of a wiring region in the first direction where the plurality of sensing wirings are disposed. The plurality of sensing electrodes includes a sensing pattern and a bridge pattern disposed on a different layer from the sensing pattern, the plurality of sensing wirings are disposed on the same layer as any one of the sensing pattern or the bridge pattern, and the blocking part is disposed on the same layer as the other of the sensing pattern or the bridge pattern.

The blocking part may cover the plurality of sensing wirings.

The blocking part may be configured to be floated or may be configured to receive a ground voltage.

The blocking part is configured to operate in a first state or a second state different from the first state. The first state may be a state in which the blocking part is configured to be floated or to receive a ground voltage, and the second state may be a state in which the blocking part is configured to receive a same voltage as that applied to the plurality of sensing wirings.

The blocking part may include a shielding layer having a mesh pattern.

A plurality of openings may be formed in the blocking part, the plurality of openings may be spaced apart in the first direction, the plurality of openings each may extend in the second direction intersecting the first direction, and each of the plurality of openings may have a width greater than a width of each of the plurality of sensing wirings.

According to one aspect of the invention, a display device includes: a display panel; and an input sensor disposed on the display panel, wherein the input sensor includes: a plurality of sensing electrodes; a plurality of sensing wirings electrically connected to the plurality of sensing electrodes, respectively; and a conductive part covering the plurality of sensing wirings, wherein the conductive part is configured to be floated or to receive a substantially constant voltage, and wherein the conductive part has a single, contiguous shape.

The conductive part may include a shielding layer having a mesh pattern.

A plurality of openings may be defined in the conductive part; and the plurality of openings may be spaced apart in a first direction, and the plurality of openings may extend in a second direction intersecting the first direction, respectively.

Each of the plurality of openings may have a width greater than a width of each of the plurality of sensing wirings.

The display device may further include a controller to receive a signal from the input sensor and to remove the signal when the signal has a shape different from a shape of a Gaussian distribution.

The substantially constant voltage may be a ground voltage.

The substantially constant voltage may be substantially the same as a voltage provided to the plurality of sensing electrodes.

In the second mode, the plurality of sensing wirings and the conductive part may be configured to receive substantially the same voltage.

The plurality of sensing electrodes may include a plurality of sensing patterns and a bridge pattern disposed on a layer different from the plurality of sensing patterns; and the plurality of sensing wirings may be disposed on the same layer as any one of the plurality of sensing patterns or the bridge pattern, and the conductive part may be disposed on the same layer as the other of the plurality of sensing patterns or the bridge pattern.

The plurality of sensing electrodes may include a plurality of first sensing electrodes and a plurality of second sensing electrodes, wherein input sensor may operate in a first mode and a second mode different from the first mode, wherein in the first mode, the plurality of first sensing electrodes may be configured to output sensing signals and the plurality of second sensing electrodes is configured to receive driving signals, and in the second mode, the plurality of first and second sensing electrodes may be configured to receive the same substantially constant voltage.

The conductive part may have a width in a first direction greater than a width of a wiring region in the first direction where the plurality of sensing wirings extending in a second direction intersecting the first direction is disposed.

An area of the conductive part may be larger than an area of the wiring region.

According to another aspect of the invention, a display device includes: a display panel; a plurality of sensing electrodes disposed on the display panel; a plurality of sensing wirings electrically connected to the plurality of sensing electrodes, respectively; and a conductive part disposed on the plurality of sensing wirings and having a width in a first direction greater than a width of a wiring region in the first direction where the plurality of sensing wirings is disposed, wherein the plurality of sensing electrodes comprise a sensing pattern and a bridge pattern disposed on a different layer from the sensing pattern, the plurality of sensing wirings are disposed on the same layer as the bridge pattern, and the conductive part is disposed on the same layer as the sensing pattern.

The conductive part may have a single, contiguous shape and cover the plurality of sensing wirings.

The single, contiguous conductive part may be configured to be floated or to receive a ground voltage.

The conductive part may be configured to operate in a first state or a second state different from the first state, wherein the first state is a state in which the conductive part may be configured to be floated or to receive a ground voltage, and the second state is a state in which the conductive part may be configured to receive the same voltage as that applied to the plurality of sensing wirings.

The single, contiguous conductive part may include a shielding layer having has a mesh pattern.

A plurality of openings may be formed in the single, contiguous conductive part; the plurality of openings may be spaced apart in a first direction, and the plurality of openings each extend in a second direction intersecting the first direction; and each of the plurality of openings may have a width greater than a width of each of the plurality of sensing wirings.

According to still another aspect of the invention, a display device includes a display panel and an input sensor disposed on the display panel, wherein the input sensor may include a plurality of sensing electrodes including first sensing electrodes and second sensing electrodes, a plurality of sensing wirings may be disposed on the same layer as the first sensing electrodes and electrically connected to the sensing electrodes, respectively, and a blocking part disposed on the same layer as the second sensing electrodes and covering the plurality of sensing wirings, and an area of the blocking part may be larger than an area of a region where the plurality of sensing wirings are disposed.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the inventive concepts.

FIG. 9 is a plan view of a third embodiment of an input sensor shown in FIG. 2.

DETAILED DESCRIPTION

Figure 1:
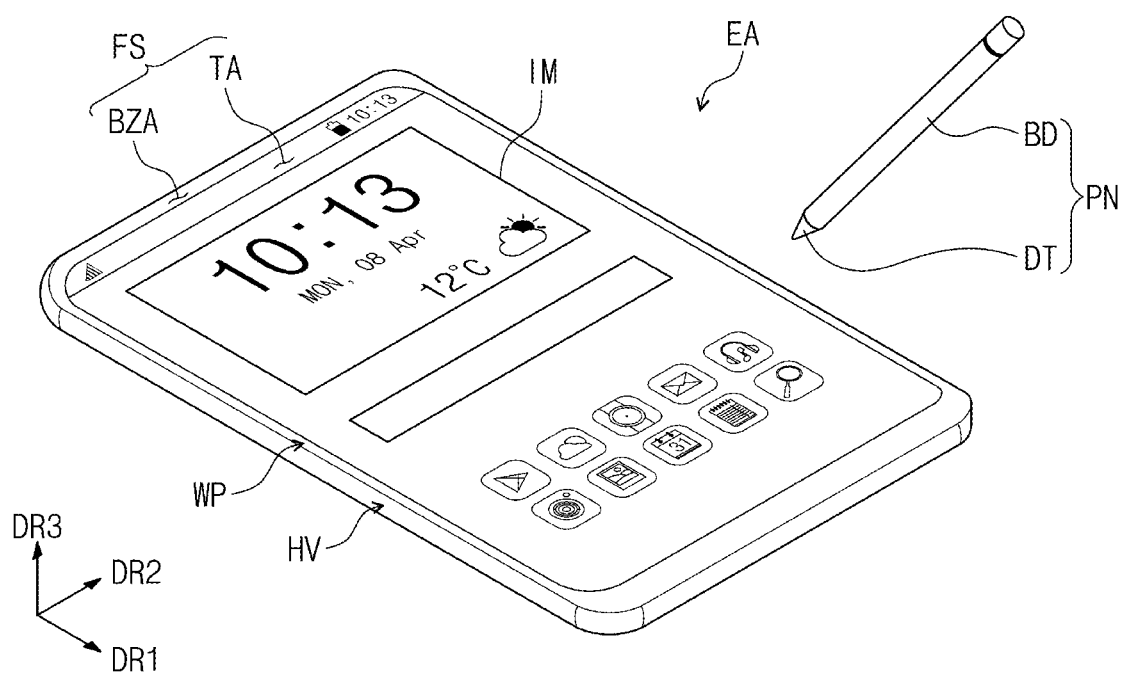
FIG. 1 is a perspective view of an embodiment of a display device constructed according to the principles of the invention.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
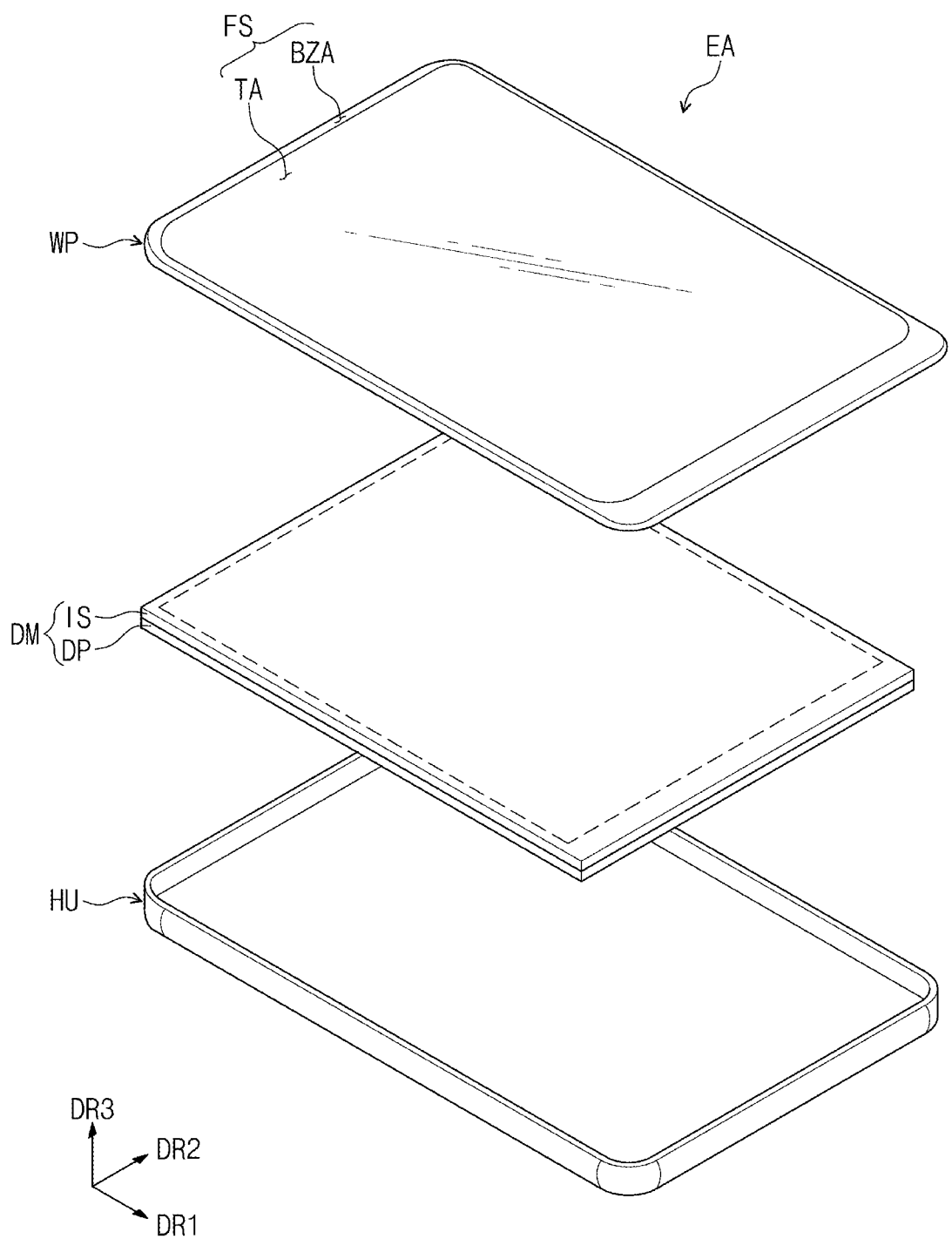
FIG. 2 is an exploded perspective view of the display device of FIG. 1.

FIG. 1 is a perspective view of an embodiment of a display device constructed according to the principle of the invention. FIG. 2 is an exploded perspective view of the display device of FIG. 1.

Referring to FIGS. 1 and 2, a display device EA may be a device activated according to electrical signals. The display device EA may be applied to or take the form of various embodiments. For example, the display device EA may not only be used for large-sized display devices such as a television set, a monitor, or an outdoor billboard but also used for small- and medium-sized display devices such as a personal computer, a laptop computer, a personal digital terminal, a car navigation unit, a game console, a portable electronic device, a smartphone, and a camera. In addition, these examples are merely presented as an embodiment, and thus it may be adopted for other display devices without departing from the inventive concepts. In the illustrated embodiment, the display device EA is exemplarily illustrated as a tablet.

The display device EA may display an image IM toward a third direction DR3 on a display surface FS parallel to a first direction DR1 and a second direction DR2, respectively. The image IM may include a still image as well as a dynamic image. FIG. 1 illustrates watch windows and icons as an example of the image IM. The display surface FS on which the image IM is displayed may correspond to a front surface of the display device EA and may correspond to a front surface of a window WP.

In the illustrated embodiment, a front surface (or an upper surface) and a rear surface (or a lower surface) of each member is defined with respect to a direction in which the image IM is displayed. The front and rear surfaces may oppose each other in a third direction DR3 and the normal direction of each of the front and rear surfaces may be parallel to the third direction DR3. In the specification, a surface defined by a first direction DR1 and a second direction DR2 is defined as a plan, and "viewed on a plan" may be defined as viewed from the third direction DR3.

The third direction DR3 may be a direction intersecting the first direction DR1 and the second direction DR2. The first direction DR1, the second direction DR2, and the third direction DR3 may be orthogonal to each other.

The display device EA may include a window WP, a display module DM, and a housing HU. In the illustrated embodiment, the window WP and the housing HU may be combined to form the exterior of the display device EA.

The window WP may include an optically transparent insulating material. For example, the window WP may include glass or plastic. The window WP may have a multi-layer structure or a single-layer structure. For example, the window WP may include a plurality of plastic films which are bonded by an adhesive, or may include a glass substrate and a plastic film, which are bonded by an adhesive.

As described above, the display surface FS of the window WP may define a front surface of the display device EA. The display surface FS may include a transmission area TA and a bezel area BZA. The transmission area TA may be an optically transparent area. For example, the transmission area TA may be an area having a visible light transmittance of about 90% or more.

The bezel area BZA may have a predetermined color. The bezel area BZA may cover a peripheral area of the display module DM to prevent the peripheral area from being viewed from the outside. Meanwhile, this is exemplarily illustrated, and in the window WP, the bezel area BZA may be omitted.

The display module DM may display an image IM and sense an external input. The display module DM may include a display panel DP and an input sensor IS.

The display panel DP may be a light emitting display panel, and is not particularly limited. For example, the display panel DP may be an organic light emitting display panel or a quantum dot light emitting display panel. An emission layer of the organic light emitting display panel may include an organic light emitting material. An emission layer of the quantum dot light emitting display panel may include a quantum dot, a quantum rod, etc.

An input sensor IS may be disposed on the display panel DP. The input sensor IS may have a multi-layer structure. The input sensor IS may sense an external input applied from the outside. The external input may be a user's input. The user's input may include various forms of external inputs such as a part of a user's body, light, heat, pen, or pressure.

The housing HU may be combined with the window WP. The housing HU may be combined with the window WP to provide a predetermined interior space. The display module DM may be accommodated in the interior space.

The housing HU may include a material having a relatively higher rigidity. For example, the housing HU may include a plurality of frames and/or plates formed of glass, plastic, or metal, or a combination thereof. The housing HU may stably protect components of the display device EA accommodated in the interior space from external shocks.

According to an embodiment, the display device EA may sense touch coordinates based on the movement of a sensing pen PN. The sensing pen PN may include a body part BD and a sensing part DT connected to one end of the body part BD. The body part BD may include a power unit, and the power unit may provide power to the sensing part DT. The sensing part DT may correspond to a general pen tip. The sensing part DT may include a conductive material. The sensing part DT may generate an electric field between surrounding conductive objects in response to the power supplied from the power unit. The sensing pen PN may include an active electrostatic pen (AES pen).

Figure 3A:
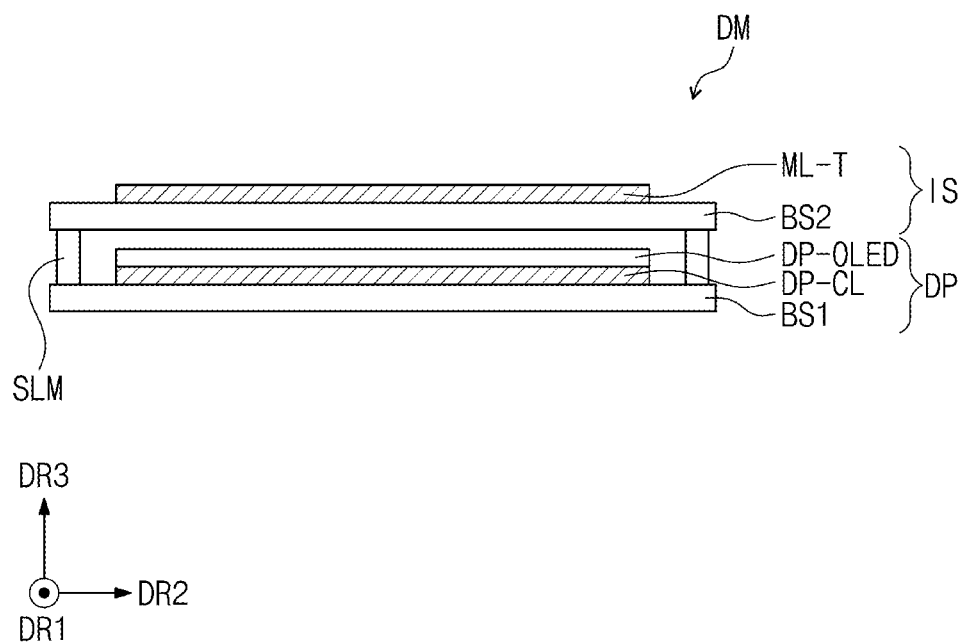
FIGS. 3A and 3B are cross-sectional views of embodiments of the display module shown in FIG. 2.

FIG. 3A is a cross-sectional view of an embodiment of the display module shown in FIG. 2.

Referring to FIG. 3A, the display module DM may include a display panel DP, an input sensor IS, and a bonding member SLM.

The display panel DP may include a first base layer BS1, a display circuit layer DP-CL, and an image implementation layer DP-OLED.

The first base layer BS1 and a second base layer BS2 each may have a stacking structure including a silicon substrate, a plastic substrate, a glass substrate, an insulating film, or a plurality of insulating layers.

The display circuit layer DP-CL may be disposed on the first base layer BS1. The display circuit layer DP-CL may include a plurality of insulating layers, a plurality of conductive layers, and a semiconductor layer. The plurality of conductive layers of the display circuit layer DP-CL may constitute signal lines or a control circuit for pixels.

The image implementation layer DP-OLED may be disposed on the display circuit layer DP-CL. The image implementation layer DP-OLED may include organic light emitting diodes. However, this is an example, and the image implementation layer DP-OLED may include inorganic light emitting diodes, organic-inorganic light emitting diodes, or a liquid crystal layer.

The input sensor IS may be disposed on the display panel DP. The input sensor IS may include a second base layer BS2 and a sensing circuit layer ML-T.

The second base layer BS2 may be disposed on the image implementation layer DP-OLED. A predetermined space may be defined between the second base layer BS2 and the image implementation layer DP-OLED. The space may be filled with air or an inert gas. In addition, the space may be filled with a filler such as a silicone-based polymer, an epoxy-based resin, or an acrylic-based resin.

The sensing circuit layer ML-T may be disposed on the second base layer BS2. The sensing circuit layer ML-T may include a plurality of insulating layers and a plurality of conductive layers. The plurality of conductive layers may include a plurality of sensing electrodes for sensing an external input and a plurality of lines in the form of sensing wirings electrically connected to the plurality of sensing electrodes, respectively. This will be described later.

A bonding member SLM may be disposed between the first base layer BS1 and the second base layer BS2. The bonding member SLM may combine the first base layer BS1 and the second base layer BS2. The bonding member SLM may include an organic material such as a photo-curable resin or a photo-plastic resin, or an inorganic material such as a frit seal, and is not limited to any one specific configuration.

Figure 3B:
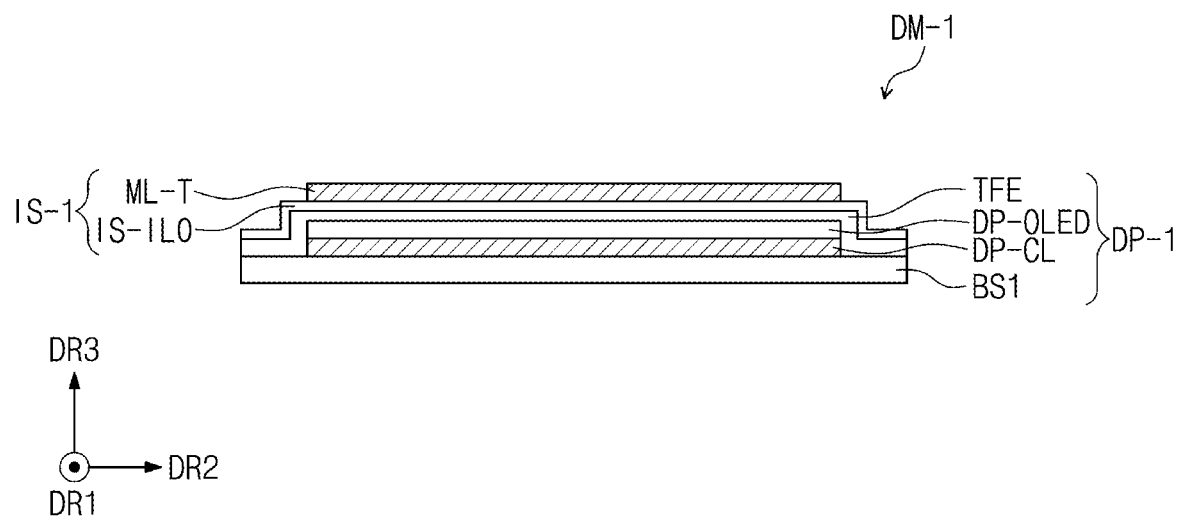

FIG. 3B is a cross-sectional view of another embodiment of the display module shown in FIG. 2. In describing FIG. 3B, like reference numerals are applied to like components described in FIG. 3A, and a repetitive description will be omitted to avoid redundancy.

Referring to FIG. 3B, a display module DM-1 may include a display panel DP-1 and an input sensor IS-1. The input sensor IS-1 may be referred to as an input sensor layer.

The display panel DP-1 may include a first base layer BS1, a display circuit layer DP-CL, an image implementation layer DP-OLED, and a thin film encapsulation layer TFE.

The thin film encapsulation layer TFE may be disposed on the image implementation layer DP-OLED to cover the image implementation layer DP-OLED. The thin film encapsulation layer TFE may include a first inorganic layer, an organic layer, and a second inorganic layer sequentially stacked along the third direction DR3. However, this is an example and the thin film encapsulation layer TFE is not limited thereto. For example, the thin film encapsulation layer TFE may further include a plurality of inorganic layers and a plurality of organic layers.

The first inorganic layer may prevent external moisture or oxygen from penetrating the image implementation layer DP-OLED. For example, the first inorganic layer may include silicon nitride, silicon oxide, or a combination thereof.

The organic layer may be disposed on the first inorganic layer to provide a flat surface. The organic layer may cover the curvature formed on an upper surface of the first inorganic layer or particles present on the first inorganic layer. For example, the organic layer may include an acrylic-based organic layer, and is not limited thereto.

The second inorganic layer may be disposed on the organic layer to cover the organic layer. The second inorganic layer may seal moisture, etc. discharged from the organic layer to prevent inflow into the outside. The second inorganic layer may include silicon nitride, silicon oxide, or a combination thereof.

The input sensor IS-1 may be formed on the display panel DP-1 through a continuous process. In this case, the input sensor IS-1 may be indicated as being directly disposed on the display panel DP-1. Being directly disposed may indicate that a third component is not disposed between the input sensor IS-1 and the display panel DP-1. That is, a separate adhesive member may not be disposed between the input sensor IS-1 and the display panel DP-1.

The input sensor IS-1 may include a base insulating layer IS-IL0 and a sensing circuit layer ML-T.

The base insulating layer IS-IL0 may be disposed on the thin film encapsulation layer TFE. The base insulating layer IS-IL0 may include an inorganic material, an organic material, or a composite material. The base insulating layer IS-IL0 may be directly disposed on the display panel DP-1. For example, the base insulating layer IS-IL0 may be in direct contact with the thin film encapsulation layer TFE. The base insulating layer IS-IL0 may have a single-layer or multi-layer structure. Alternatively, the base insulating layer IS-IL0 may be omitted.

The sensing circuit layer ML-T may be disposed on the base insulating layer IS-IL0.

Figure 4:
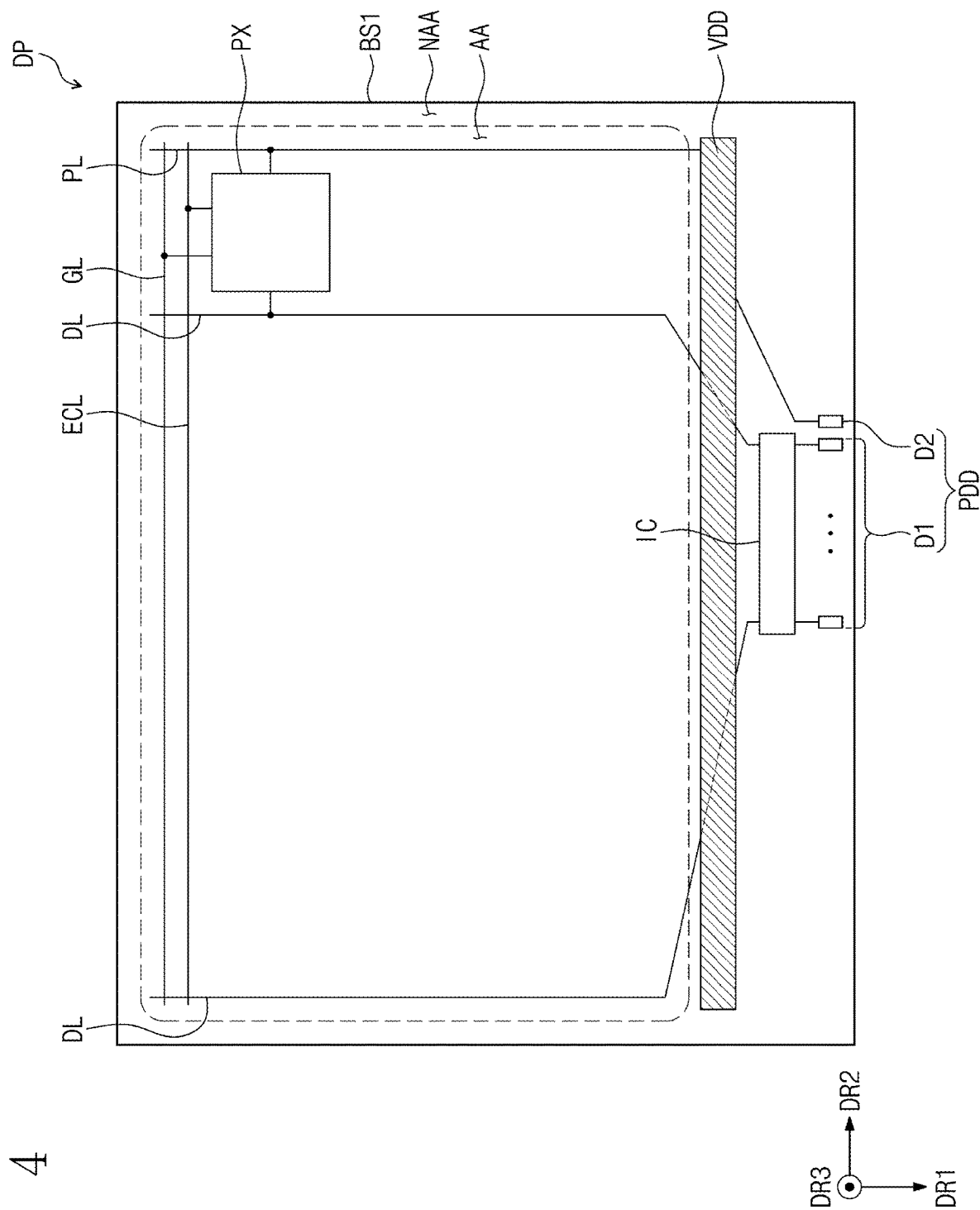
FIG. 4 is a plan view of an embodiment of the display panel shown in FIG. 2.

FIG. 4 is a plan view of an embodiment of the display panel shown in FIG. 2.

Referring to FIG. 4, the display panel DP may include a first base layer BS1, a plurality of pixels PX, a plurality of signal lines GL, DL, PL, and ECL, and a plurality of display pads PDD.

An active area AA and a peripheral area NAA adjacent to the active area AA may be defined in the display panel DP. The active area AA may be an area where the image IM (see FIG. 1) is displayed, and the peripheral area NAA may be an area where a driving circuit or a driving wire is disposed. A plurality of pixels PX may be disposed in the active area AA. The active area AA may correspond to the transmission area TA (see FIG. 1). The peripheral area NAA may correspond to the bezel area BZA (see FIG. 1).

The plurality of signal lines GL, DL, PL, and ECL may be disposed on the first base layer BS1. The plurality of signal lines GL, DL, PL, and ECL may be connected to the plurality of pixels PX to transmit an electrical signal to the plurality of pixels PX. Among the signal lines included in the display panel DP, a plurality of scan lines GL (hereinafter, scan lines), a plurality of data lines DL (hereinafter, data lines), a plurality of power lines PL (hereinafter, power lines), and a plurality of emission control lines ECL (hereinafter, emission control lines) are exemplarily illustrated. However, this is an example, and the plurality of signal lines GL, DL, PL, and ECL may further include initialization voltage lines, and are not limited to any one configuration. The plurality of signal lines GL, DL, PL, and ECL may constitute the display circuit layer DP-CL (see FIG. 3A).

A power pattern VDD may be disposed in the peripheral area NAA. The power pattern VDD may be connected to the power lines PL. The display panel DP may include the power pattern VDD to provide the same power signal to the plurality of pixels PX.

The display pads PDD may include a first pad D1 and a second pad D2. The first pad D1 may be provided in plural. The plurality of first pads D1 may be connected to the data lines DL, respectively. The second pad D2 may be connected to the power pattern VDD to be electrically connected to the power line PL. The display panel DP may provide electrical signals provided from the outside to the plurality of pixels PX through the display pads PDD. The display pads PDD may further include pads for receiving other electrical signals in addition to the first pad D1 and the second pad D2, and are not limited to any one configuration.

A driving chip IC may be mounted in the peripheral area NAA. The driving chip IC may be a chip-type timing control circuit. The data lines DL may be electrically connected to the plurality of first pads D1 through the driving chip IC, respectively. However, this is an example, and the driving chip IC may be mounted on a separate film from the display panel DP. In this case, the driving chip IC may be electrically connected to the display pads PDD through the film.

Figure 5:
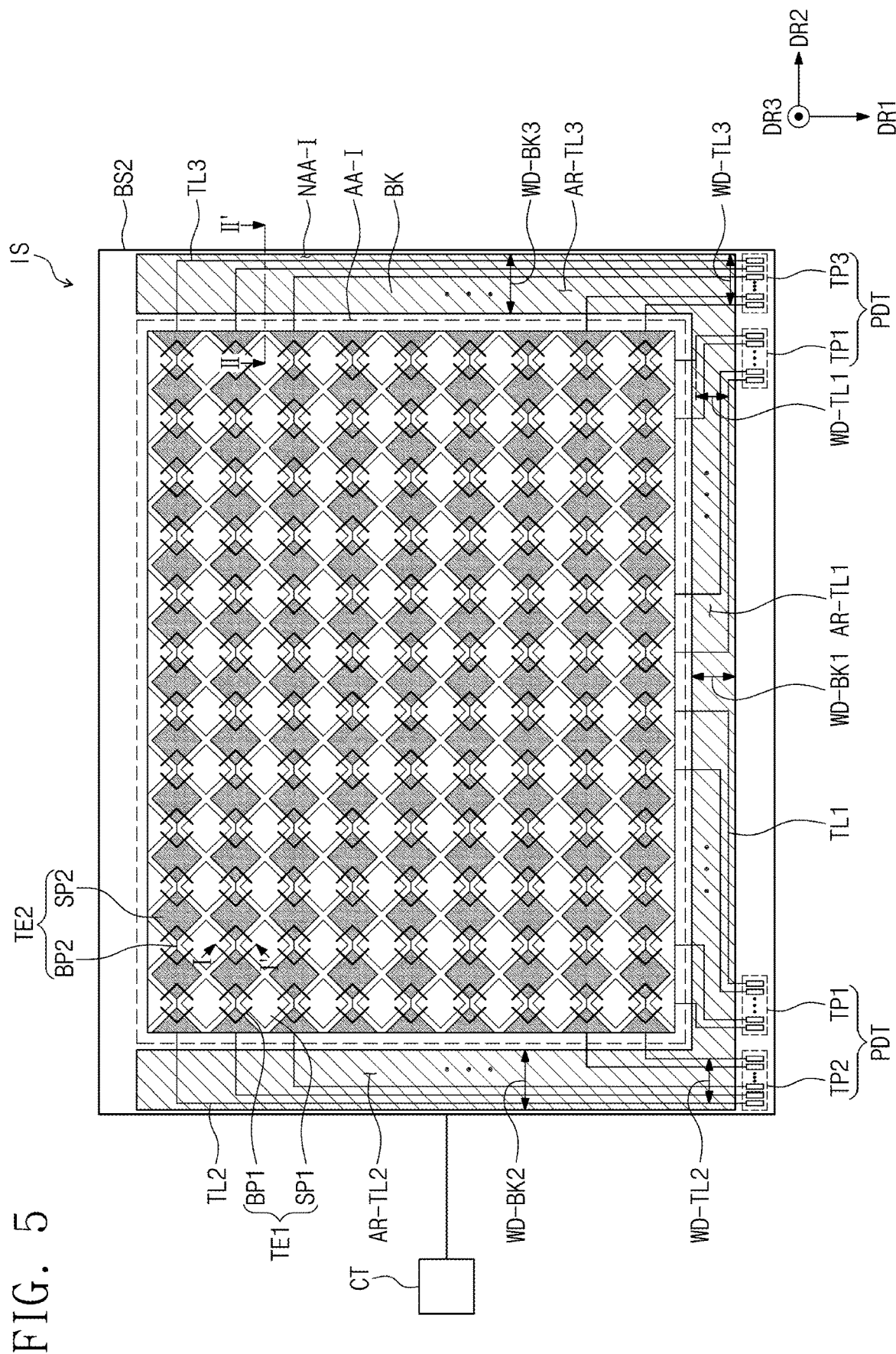
FIG. 5 is a plan view of a first embodiment of the input sensor shown in FIG. 2.

FIG. 5 is a plan view of a first embodiment of the input sensor shown in FIG. 2.

Referring to FIGS. 1, 4, and 5, the input sensor IS may include a second base layer BS2, a plurality of sensing electrodes TE1 and TE2, a plurality of lines in the form of sensing wirings TL1, TL2, and TL3, a plurality of sensing pads PDT, and a blocking part that may be in the form of a shielding layer or any other structure or member that blocks electrical or electrostatic interference from reaching the sensing wirings.

An active area AA-I and a peripheral area NAA-I adjacent to the active area AA-I may be defined in the input sensor IS. The active area AA-I may be an area sensing an external input, and the peripheral area NAA-I may be an area where wirings, etc. are disposed. A plurality of sensing electrodes TE1 and TE2 may be disposed in the active area AA-I. The active area AA-I may correspond to the transmission area TA and the active area AA of the display panel DP. The peripheral area NAA-I may correspond to the bezel area BZA and the peripheral area NAA of the display panel DP.

The display device EA may further include a controller CT that controls the input sensor IS. The controller CT may control the input sensor IS to operate in the first mode or the second mode.

The first mode may be a touch mode that recognizes input via a part of a user's body.

In the first mode, a plurality of first sensing electrodes TE1 may output a sensing signal, and a plurality of second sensing electrodes TE2 may receive a driving signal. In this case, the display device EA may apply the driving signal to the plurality of second sensing electrodes TE2 to scan the active area AA-I, and may sense an area where a touch is applied through a sensing signal output from the plurality of first sensing electrodes TE1. For example, the input sensor IS may be driven in a mutual capacitive type in the first mode.

This configuration is exemplarily illustrated, and the plurality of first sensing electrodes TE1 may receive a driving signal, and the plurality of second sensing electrodes TE2 may output a sensing signal, and additionally receive or output other electrical signals.

The second mode may be a mode after the first mode. The second mode may be a pen mode that recognizes the sensing pen PN.

In the second mode, the same sensing signal may be provided to the plurality of first sensing electrodes TE1 and the plurality of second sensing electrodes TE2. The sensing signal may be a substantially constant voltage. The substantially constant voltage may have a voltage different from the voltage provided to the sensing part DT. For example, the substantially constant voltage may have a value of about 1V (volt) to about 2V. However, this is an example and the value of the substantially constant voltage is not limited thereto.

In addition, the input sensor IS may sense change in amount of voltage/current of the sensing signal provided to the plurality of first sensing electrodes TE1 and the plurality of second sensing electrodes TE2. The input sensor IS may recognize touch coordinates based on the change in amount of voltage/current. For example, the input sensor IS may be driven by sensing an electrostatic signal input from the outside (e.g., an active electrostatic pen (AES pen) in the second mode.

The plurality of sensing electrodes TE1 and TE2 may include a plurality of first sensing electrodes TE1 and a plurality of second sensing electrodes TE2. The plurality of first sensing electrodes TE1 and the plurality of second sensing electrodes TE2 may be disposed on the active area AA-I.

According to an embodiment, when the sensing pen PN contacts or approaches the input sensor IS in the second mode, the input sensor IS may sense touch coordinates. When the sensing part DT of the sensing pen PN contacts or approaches the input sensor IS, an electric field may be generated between the sensing part DT and the plurality of sensing electrodes TE1 and TE2.

In this case, the intensity of the voltage provided to the sensing part DT and the intensity of the voltage provided to the plurality of sensing electrodes TE1 and TE2 may be different from each other. A potential difference may be generated as the intensity of the voltage provided to the sensing part DT and the intensity of the voltage provided to the plurality of sensing electrodes TE1 and TE2 are different from each other. Due to the potential difference, an electric field may be generated between the sensing part DT and the plurality of sensing electrodes TE1 and TE2. Based on the intensity of the electric field between the sensing part DT and the plurality of sensing electrodes TE1 and TE2, the input sensor IS may touch sensing coordinates.

The plurality of first sensing electrodes TE1 each may extend along the first direction DR1. The plurality of first sensing electrodes TE1 may be arranged along the second direction DR2. The plurality of first sensing electrodes TE1 each may include a plurality of sensing patterns SP1 and a plurality of bridge patterns BP1. The plurality of sensing patterns SP1 may be arranged in the first direction DR1. The plurality of sensing patterns SP1 may be referred to as a plurality of first sensing patterns SP1. At least one bridge pattern BP1 may connect two sensing patterns SP1 adjacent to each other.

The plurality of second sensing electrodes TE2 each may extend along the second direction DR2. The plurality of second sensing electrodes TE2 may be arranged along the first direction DR1. The plurality of second sensing electrodes TE2 each may include a plurality of first portions SP2 and a plurality of second portions BP2. The plurality of first portions SP2 may be arranged in the second direction DR2. The plurality of first portions SP2 may be referred to as a plurality of second sensing patterns SP2. At least one second portion BP2 may connect two first portions SP2 adjacent to each other. The plurality of second portions BP2 may insulatively cross the plurality of bridge patterns BP1, respectively.

The plurality of sensing wirings TL1, TL2, and TL3 may be disposed in the peripheral area NAA-I. The plurality of sensing wirings TL1, TL2, and TL3 may include a plurality of first sensing wirings TL1, a plurality of second sensing wirings TL2, and a plurality of third sensing wirings TL3.

The plurality of first sensing wirings TL1 may be connected to the plurality of first sensing electrodes TE1, respectively. The plurality of second sensing wirings TL2 may be connected to one end of the plurality of second sensing electrodes TE2, respectively. The plurality of third sensing wirings TL3 may be connected to the other end of the plurality of second sensing electrodes TE2, respectively. The other end of the plurality of second sensing electrodes TE2 may be a portion opposite to one end of the plurality of second sensing electrodes TE2.

The plurality of second sensing electrodes TE2 may be connected to the plurality of second sensing wirings TL2 and the plurality of third sensing wirings TL3, respectively. Accordingly, sensitivity according to a region may be substantially uniformly maintained for the plurality of second sensing electrodes TE2 having a relatively longer length compared to the plurality of first sensing electrodes TE1.

The plurality of sensing pads PDT may be disposed in the peripheral area NAA-I. The plurality of sensing pads PDT may include a plurality of first sensing pads TP1, a plurality of second sensing pads TP2, and a plurality of third sensing pads TP3.

The plurality of first sensing pads TP1 may be connected to the plurality of first sensing wirings TL1, respectively. The plurality of first sensing pads TP1 may be electrically connected to the plurality of first sensing electrodes TE1, respectively.

The plurality of second sensing pads TP2 may be connected to the plurality of second sensing wirings TL2, respectively. The plurality of third sensing pads TP3 may be connected to the plurality of third sensing wirings TL3, respectively. The plurality of second sensing pads TP2 and the plurality of third sensing pads TP3 may be connected to the plurality of second sensing electrodes TE2, respectively.

Some of the plurality of first sensing pads TP1 may be disposed adjacent to the plurality of second sensing pads TP2. The rest of the plurality of first sensing pads TP1 may be disposed adjacent to the plurality of third sensing pads TP3. However, this is an example and the arrangement relationship of each of the sensing pads PDT is not limited thereto, and may be variously modified.

The blocking part BK may be disposed in the peripheral area NAA-I. A ground voltage may be provided to the blocking part BK. However, this is an example and the electrical state of the blocking part BK s not limited thereto. For example, the blocking part BK may be floated.

When viewed on a plan, the blocking part BK may cover a plurality of sensing wirings TL1, TL2, and TL3. When viewed on a plan, the area of the blocking part BK may be larger than the area of a region where the plurality of sensing wirings TL1, TL2, and TL3 are disposed.

The first wiring region AR-TL1 where the plurality of first sensing wirings TL1 extending in the second direction DR2 are disposed may have a width WD-TL1 in the first direction DR1. The blocking part BK overlapping the plurality of first sensing wirings TL1 may have a width WD-BK1 in the first direction DR1. The width WD-BK1 of the blocking part BK may be greater than the width WD-TL1 of a region where the plurality of first sensing wirings TL1 are disposed.

The second wiring region AR-TL2 where the plurality of second sensing wirings TL2 extending in the first direction DR1 are disposed may have a width WD-TL2 in the second direction DR2. The blocking part BK overlapping the plurality of second sensing wirings TL2 may have a width WD-BK2 in the second direction DR2. The width WD-BK2 of the blocking part BK may be greater than the width WD-TL2 of a region where the plurality of second sensing wirings TL2 are disposed.

The third wiring region AR-TL3 where the plurality of third sensing wirings TL3 extending in the first direction DR1 are disposed may have a width WD-TL3 in the second direction DR2. The blocking part BK overlapping the plurality of third sensing wirings TL3 may have a width WD-BK3 in the second direction DR2. The width WD-BK3 of the blocking part BK may be greater than the width WD-TL3 of a region where the plurality of third sensing wirings TL3 are disposed.

In general, in the second mode, when the sensing pen PN is adjacent to the boundaries of the active area AA-I and the peripheral area NAA-I, an electric field may be generated between the sensing part DT and the plurality of sensing wirings TL1, TL2, and TL3. Jitter may be generated due to the electric field. In addition, when the active area AA-I and the plurality of sensing wirings TL1, TL2, and TL3 are spaced apart by a predetermined distance to prevent the generation of the electric field, the area of the bezel area BZA may increase. However, according to the embodiments, the blocking part BK may be disposed on the plurality of sensing wirings TL1, TL2, and TL3. The blocking part BK may block static electricity provided from the sensing pen PN in the second mode. The blocking part BK may prevent the electric field from being generated between the sensing pen PN and the plurality of sensing wirings TL1, TL2, and TL3 in the second mode. The blocking part BK may prevent the jitter from being generated between the sensing pen PN and the plurality of sensing wirings TL1, TL2, and TL3. The blocking part BK may prevent a signal transmitted through the plurality of sensing wirings TL1, TL2 and TL3 from being distorted by the sensing pen PN. Accordingly, a display device EA having reduced noise may be provided, and a display device EA having improved sensing reliability at the boundaries of the active area AA-I and the peripheral area NAA-I may be provided. In addition, a display device EA having a reduced area of the bezel area BZA may be provided.

Figure 6:
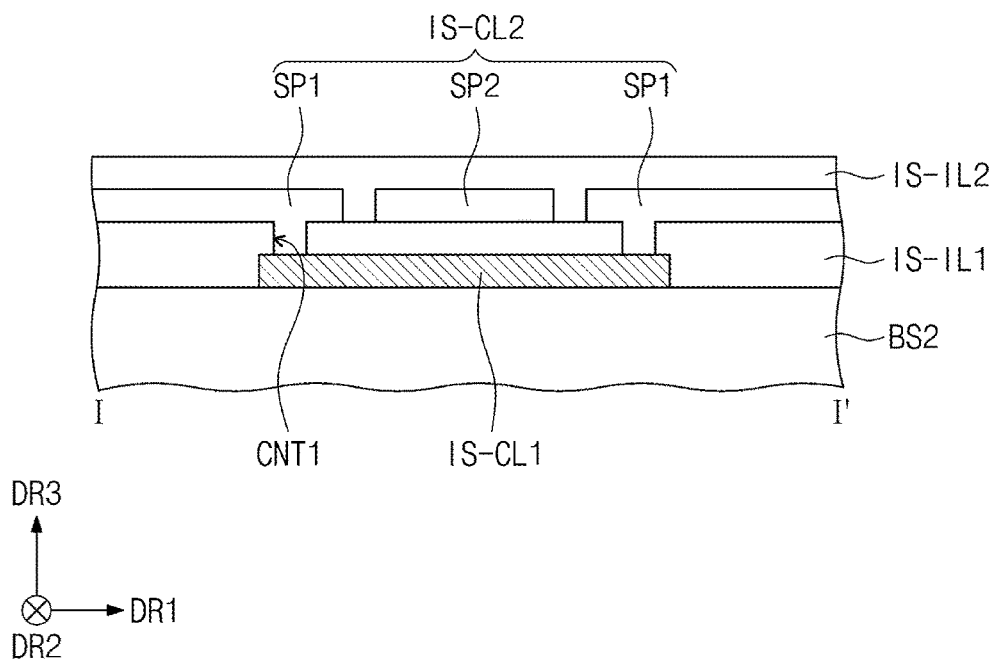
FIG. 6 is a cross-sectional view of a portion of the input sensor taken along line I-I' of FIG. 5.

FIG. 6 is a cross-sectional view of a portion of the input sensor taken along line I-I' of FIG. 5.

Referring to FIGS. 5 and 6, a sensing circuit layer ML-T (see FIG. 3A) may be disposed on the second base layer BS2. However, this is an example and the stacking structure of the input sensor IS is not limited thereto. For example, the second base layer BS2 may be a base insulating layer IS-IL0 (see FIG. 3B), and the sensing circuit layer ML-T (see FIG. 3B) may be disposed on the base insulating layer IS-IL0.

The sensing circuit layer ML-T (see FIG. 3A) may include a first conductive layer IS-CL1, a first insulating layer IS-IL1, a second conductive layer IS-CL2, and a second insulating layer IS-IL2. The first insulating layer IS-IL1 and the second insulating layer IS-IL2 each may have a single-layer or multi-layer structure. The first insulating layer IS-IL1 and the second insulating layer IS-IL2 each may include an inorganic material, an organic material, or a composite material.

The first conductive layer IS-CL1 may be disposed on the second base layer BS2. The first conductive layer IS-CL1 of FIG. 6 may include a plurality of bridge patterns BP1 of FIG. 5.

The first conductive layer IS-CL1 may include an opaque metal conductive layer. For example, the first conductive layer IS-CL1 may include a metal material, for example, molybdenum, silver, titanium, copper, aluminum, or an alloy thereof. The alloy may be, for example, molybdenum niobium. In addition, the metal layer may include a conductive polymer such as PEDOT, a metal nanowire, graphene, etc.

The first insulating layer IS-IL1 may be disposed on the first conductive layer IS-CL1 and the second base layer BS2. A plurality of first contact holes CNT1 penetrating in the third direction DR3 may be defined in the first insulating layer IS-IL1.

The second conductive layer IS-CL2 may be disposed on the first insulating layer IS-IL1. The second conductive layer IS-CL2 may include a plurality of second sensing electrodes TE2 and a plurality of sensing patterns SP1. Two adjacent sensing patterns SP1 among the plurality of sensing patterns SP1 may be electrically connected to the bridge pattern BP1 through the plurality of first contact holes CNT1.

The second conductive layer IS-CL2 may include a transparent conductive layer. As used herein, being "transparent" means that the light transmittance is greater than a predetermined level. For example, the predetermined level may be 90%, but the embodiments are not limited thereto. The transparent conductive layer may include a transparent conductive oxide such as indium tin oxide (ITO), indium zinc oxide (IZO), zinc oxide (ZnO), or indium zinc tin oxide (IZTO). However, this is an example and the second conductive layer IS-CL2 is not limited thereto. For example, the second conductive layer IS-CL1 may include a metal layer. For example, the metal layer may include molybdenum, silver, titanium, copper, aluminum, and an alloy thereof. In addition, the metal layer may include a conductive polymer such as PEDOT, a metal nanowire, graphene, etc.

Figure 7:
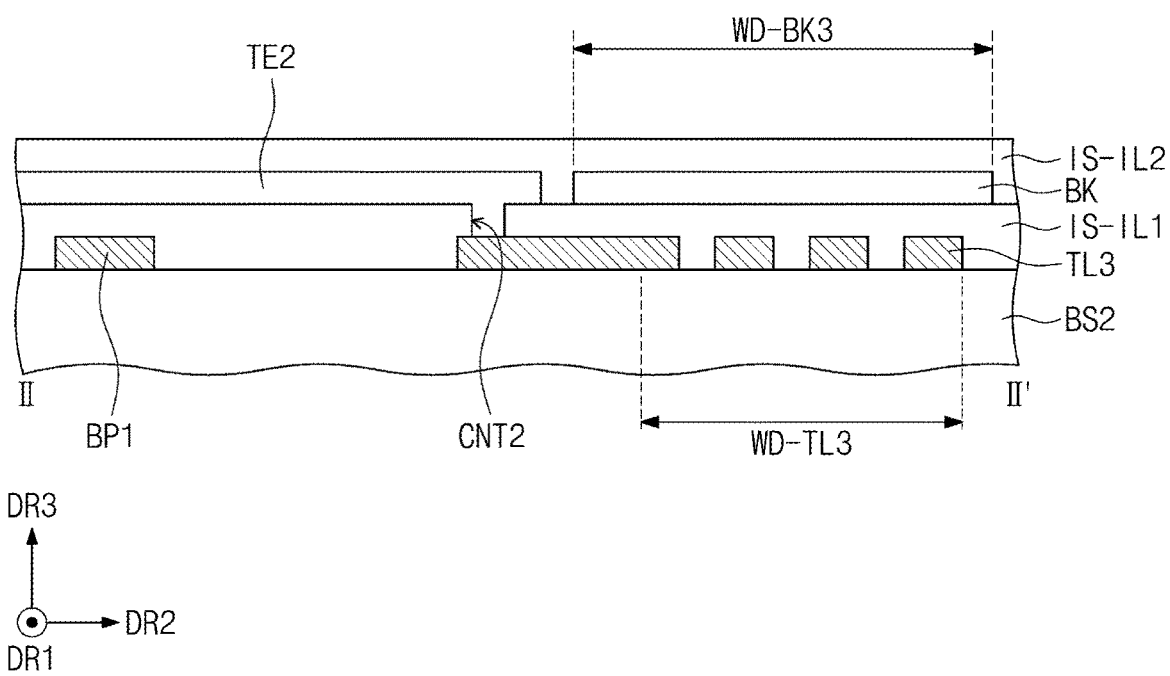
FIG. 7 is a cross-sectional view of a portion of the input sensor taken along line II-II' of FIG. 5.

FIG. 7 is a cross-sectional view of a portion of the input sensor taken along line II-II' of FIG. 5. In describing FIG. 7, like reference numerals are applied to the components described in FIG. 6, and a repetitive description will be omitted to avoid redundancy.

Referring to FIGS. 5 to 7, a bridge pattern BP1 and a plurality of third sensing wirings TL3 may be disposed on the second base layer BS2. The bridge pattern BP1 and the plurality of third sensing wirings TL3 may be formed through the same process to include the same material and have the same stacking structure.

The first insulating layer IS-IL1 may be disposed on the bridge pattern BP1 and the plurality of third sensing wirings TL3. A plurality of second contact holes CNT2 penetrating in the third direction DR3 may be defined in the first insulating layer IS-IL1.

The plurality of second sensing electrodes TE2 and the blocking part BK may be disposed on the first insulating layer IS-IL1. The plurality of second sensing electrodes TE2 and the blocking part BK may be formed through the same process to include the same material and have the same stacking structure. Accordingly, for example, the blocking part BK may include a transparent conductive layer as like the second conductive layer IS-CL2. The plurality of second sensing electrodes TE2 may be connected to the plurality of third sensing wirings TL3 through the plurality of second contact holes CNT2.

The second insulating layer IS-IL2 may be disposed on the plurality of second sensing electrodes TE2 and the blocking part BK.

According to the embodiments, the blocking part BK may be formed simultaneously while the plurality of sensing patterns SP1 and the plurality of second sensing electrodes TE2 are formed. Accordingly, a display device EA (see FIG. 1) having a simplified process may be provided. In addition, the widths WD-TL1, WD-TL2, and WD-TL3 of the plurality of sensing wirings TL1, TL2, and TL3 are smaller than the widths WD-BK1, WD-BK2, and WD-BK3 of the blocking part BK. When viewed on a plan, the blocking part BK may cover a plurality of sensing wirings TL1, TL2, and TL3. The blocking part BK may block static electricity provided from the sensing pen PN (see FIG. 1). The blocking part BK may prevent an electric field from being generated between the sensing pen PN (see FIG. 1) and the plurality of sensing wirings TL1, TL2 and TL3. The blocking part BK may prevent jitter from being generated between the sensing pen PN (see FIG. 1) and the plurality of sensing wirings TL1, TL2 and TL3. The blocking part BK may prevent a signal transmitted through the plurality of sensing wirings TL1, TL2, and TL3 from being distorted by the sensing pen PN (see FIG. 1). Accordingly, a display device EA (see FIG. 1) having reduced noise may be provided, and a display device EA (see FIG. 1) having improved sensing reliability at the boundaries of the active area AA-I and the peripheral area NAA-I may be provided.

Figure 8:
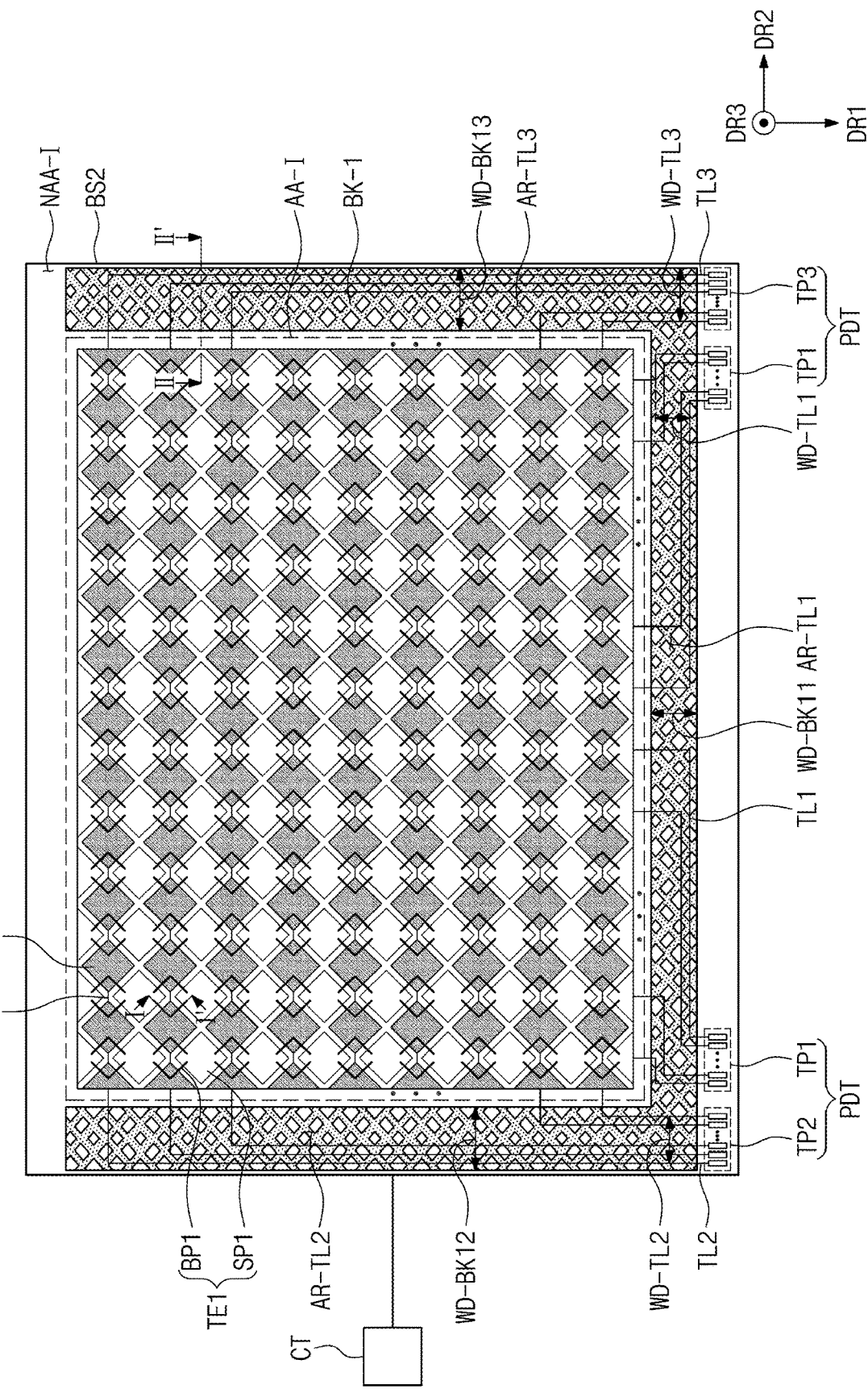
FIG. 8 is a plan view of a second embodiment of an input sensor shown in FIG. 2.

FIG. 8 is a plan view of a second embodiment an input sensor shown in FIG. 2. In describing FIG. 8, like reference numerals are applied to the components described in FIG. 5, and a repetitive description will be omitted to avoid redundancy.

Referring to FIG. 8, the input sensor IS-1 may include a second base layer BS2, a plurality of sensing electrodes TE1 and TE2, a plurality of sensing wirings TL1, TL2, and TL3, a plurality of sensing pads PDT, and a blocking part BK-1.

The blocking part BK-1 may have a mesh pattern.

The blocking part BK-1 overlapping the plurality of first sensing wirings TL1 may have a width WD-BK11 in the first direction DR1. The width WD-BK11 of the blocking part BK-1 may be greater than the width WD-TL1 of the first wiring region AR-TL1 where the plurality of first sensing wirings TL1 are disposed.

The blocking part BK-1 overlapping the plurality of second sensing wirings TL2 may have a width WD-BK12 in the second direction DR2. The width WD-BK12 of the blocking part BK-1 may be greater than the width WD-TL2 of the second wiring region AR-TL2 where the plurality of second sensing wirings TL2 are disposed.

The blocking part BK-1 overlapping the plurality of third sensing wirings TL3 may have a width WD-BK13 in the second direction DR2. The width WD-BK13 of the blocking part BK-1 may be greater than the width WD-TL3 of the third wiring region AR-TL3 where the plurality of third sensing wirings TL3 are disposed.

According to the embodiments, the blocking part BK-1 may be disposed on the plurality of sensing wirings TL1, TL2, and TL3. The blocking part BK may block static electricity provided from the sensing pen PN (see FIG. 1). The blocking part BK-1 may prevent an electric field from being generated between the sensing pen PN (see FIG. 1) and the plurality of sensing wirings TL1, TL2, and TL3. The blocking part BK-1 may prevent jitter from being generated between the sensing pen PN (see FIG. 1) and the plurality of sensing wirings TL1, TL2, and TL3. The blocking part BK-1 may prevent a signal transmitted through the plurality of sensing wirings TL1, TL2, and TL3 from being distorted by the sensing pen PN (see FIG. 1). Accordingly, a display device EA (see FIG. 1) having improved sensing reliability at the boundaries of the active area AA-I and the peripheral area NAA-I may be provided. In addition, parasitic capacitance formed between the blocking part BK-1 and the plurality of sensing wirings TL1, TL2, and TL3 may be reduced by a plurality of openings defined in the mesh pattern. When the sensing pen PN (see FIG. 1) is sensed in the active area AA-I, the parasitic capacitance is reduced, thereby having reduced signal distortion generated by the parasitic capacitance. Accordingly, a display device EA (see FIG. 1) having improved sensing reliability in the active area AA-I may be provided.

Figure 10A:
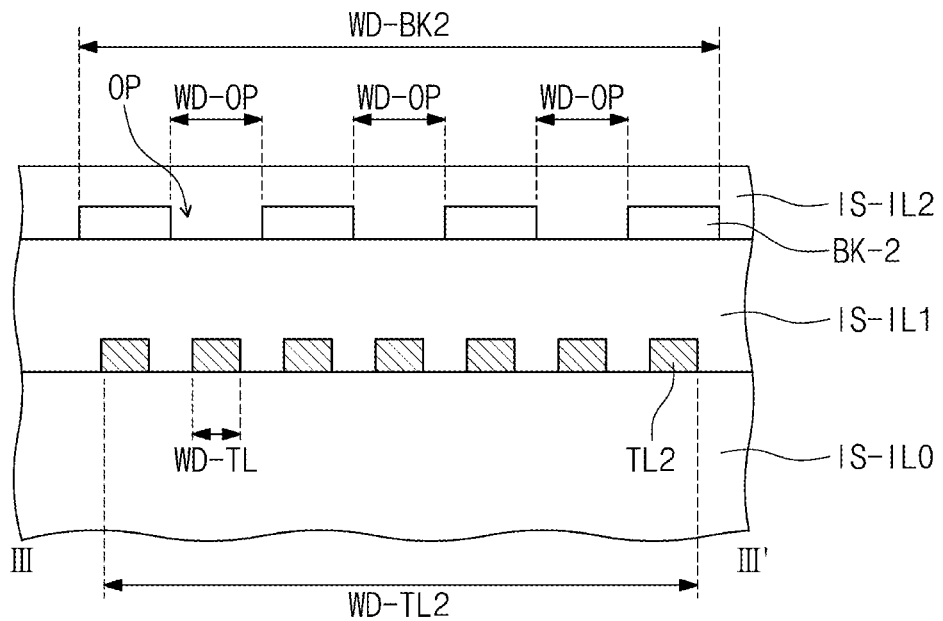
FIG. 10A is a cross-sectional view taken along line III-III' of FIG. 9.
Figure 10B:
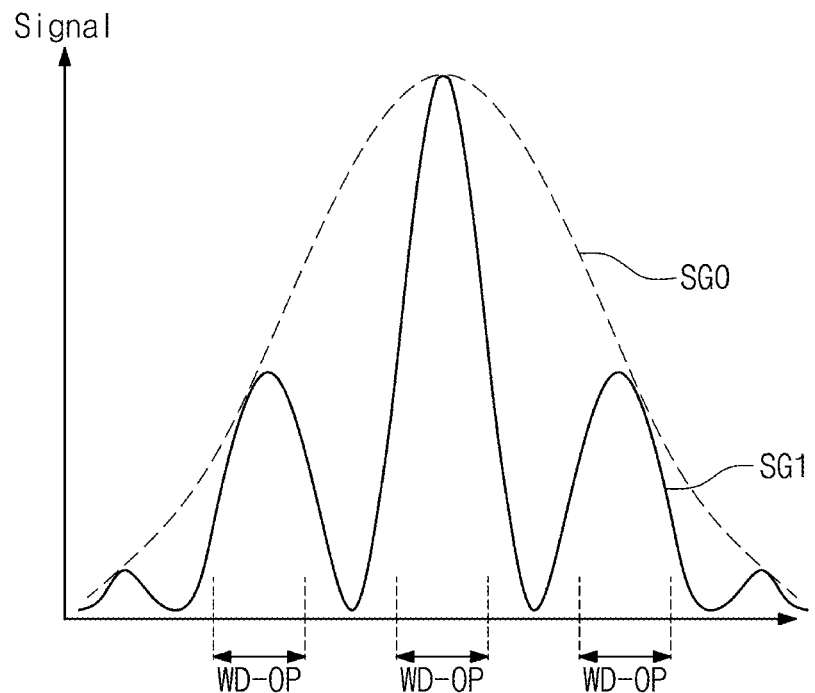
FIG. 10B is a graph illustrating a signal between a blocking part and a sensing wiring shown in FIG. 9.

FIG. 9 is a plan view of a third embodiment an input sensor shown in FIG. 2, FIG. 10A is a cross-sectional view taken along line III-III' of FIG. 9, and FIG. 10B is a graph illustrating a signal between a blocking part and a sensing wiring shown in FIG. 9. In describing FIG. 9, like reference numerals are applied to the components described in FIG. 5, and a repetitive description will be omitted to avoid redundancy.

Referring to FIGS. 9, 10A, and 10B, the input sensor IS-2 may include a second base layer BS2, a plurality of sensing electrodes TE1 and TE2, a plurality of sensing wirings TL1, TL2, and TL3, a plurality of sensing pads PDT, and a blocking part BK-2.

A plurality of openings OP may be defined in the blocking part BK-2. The plurality of openings OP may include a plurality of first openings OP-1, a plurality of second openings OP-2, and a plurality of third openings OP-3.

The plurality of first openings OP-1 may overlap the plurality of first sensing wirings TL1. The plurality of first openings OP-1 may be spaced apart in the first direction DR1, and the plurality of first openings OP-1 may extend in the second direction DR2, respectively. Although FIG. 9 exemplarily illustrates four first openings OP-1, the number of the plurality of first openings OP-1 is not limited thereto. The number of the first openings OP-1 may be provided based on the number of the plurality of first sensing wirings TL1. For example, the number of the plurality of first openings OP-1 may be provided as ½ of the number of the plurality of first sensing wirings TL1.

The plurality of second openings OP-2 may overlap the plurality of second sensing wirings TL2. The plurality of second openings OP-2 may be spaced apart in the second direction DR2, and the plurality of second openings OP-2 may extend in the first direction DR1, respectively. Although FIG. 9 exemplarily illustrates four second openings OP-2, the number of the plurality of second openings OP-2 is not limited thereto. The number of the plurality of second openings OP-2 may be provided based on the number of the plurality of second sensing wirings TL2. For example, the number of the plurality of second openings OP-2 may be provided as ½ of the number of the plurality of second sensing wirings TL2.

The plurality of third openings OP-3 may overlap the plurality of third sensing wirings TL3. The plurality of third openings OP-3 may be spaced apart in the second direction DR2, and the plurality of second openings OP-2 may extend in the first direction DR1, respectively. Although FIG. 9 exemplarily illustrates four third openings OP-3, the number of the plurality of third openings OP-3 is not limited thereto. The number of the plurality of the third openings OP-3 may be provided based on the number of the plurality of the third sensing wirings TL3. For example, the number of the plurality of third openings OP-3 may be provided as ½ of the number of the plurality of third sensing wirings TL3.

The blocking part BK-2 overlapping the plurality of first sensing wirings TL1 may have a width WD-BK21 in the first direction DR1. The width WD-BK21 of the blocking part BK-2 may be greater than the width WD-TL1 of the first wiring region AR-TL1 where the plurality of first sensing wirings TL1 are disposed.

The blocking part BK-2 overlapping the plurality of second sensing wirings TL2 may have a width WD-BK22 in the second direction DR2. The width WD-BK22 of the blocking part BK-2 may be larger than the width WD-TL2 of the second wiring region AR-TL2 where the plurality of second sensing wirings TL2 are disposed.

The blocking part BK-2 overlapping the plurality of third sensing wirings TL3 may have a width WD-BK23 in the second direction DR2. The width WD-BK23 of the blocking part BK-2 may be greater than the width WD-TL3 of the third wiring region AR-TL3 where the plurality of third sensing wirings TL3 are disposed.

The widths WD-OP of the plurality of openings OP each may be greater than the widths WD-TL of the plurality of sensing wirings TL1, TL2, and TL3 each.

The controller CT may receive a signal SG from an input sensor IS-2 to determine whether the signal SG has the shape of a Gaussian distribution.

When the signal SG has the shape of the Gaussian distribution, the controller CT may not remove the signal SG, and when the signal SG has a shape different from the shape of the Gaussian distribution, the controller CT may remove the signal SG.

In general, when the sensing pen PN (see FIG. 1) is adjacent to the boundaries of the active area AA-I and the peripheral area NAA-I, an electric field may be generated between the sensing part DT (see FIG. 1) and a plurality of sensing wirings TL1, TL2, and TL3. For example, referring to FIG. 10B, a first signal SG0 (shown as a dotted line in FIG. 10B) may be generated in the sensing wirings TL1, TL2, and TL3 by the electric field. The first signal SG0 may have a shape of the Gaussian distribution. The first signal SG0 may be jitter. However, according to the embodiments, the blocking part BK-2 may block a part of static electricity provided from the sensing pen PN (see FIG. 1) at the boundaries of the active area AA-I and the peripheral area NAA-I. Therefore, referring to FIG. 10B, the signal generated in the sensing wirings TL1, TL2, and TL3 may have the same shape as a second signal SG1 (shown as a solid line in FIG. 10B) by the blocking part BK-2. The second signal SG1 may have a shape different from the shape of the Gaussian distribution by the blocking part BK-2. For example, the second signal SG1 may decrease in the region where the blocking part BK-2 is disposed, and may have a shape in which a signal is applied by widths WD-OP of the plurality of openings OP each in the region where the plurality of openings OP are defined.

When the second signal SG1 is input, the controller CT may remove the second signal SG1. Accordingly, a display device EA (see FIG. 1) having improved sensing reliability at the boundaries of the active area AA-I and the peripheral area NAA-I may be provided. In addition, the blocking part BK-2 where the plurality of openings OP are defined may reduce parasitic capacitance formed between the blocking part BK-2 and the plurality of sensing wirings TL1, TL2, and TL3. When the sensing pen PN (see FIG. 1) is sensed in the active area AA-I, signal distortion generated by the parasitic capacitance may be reduced. Accordingly, a display device EA (see FIG. 1) having improved sensing reliability in the active area AA-I may be provided.

Figure 11:
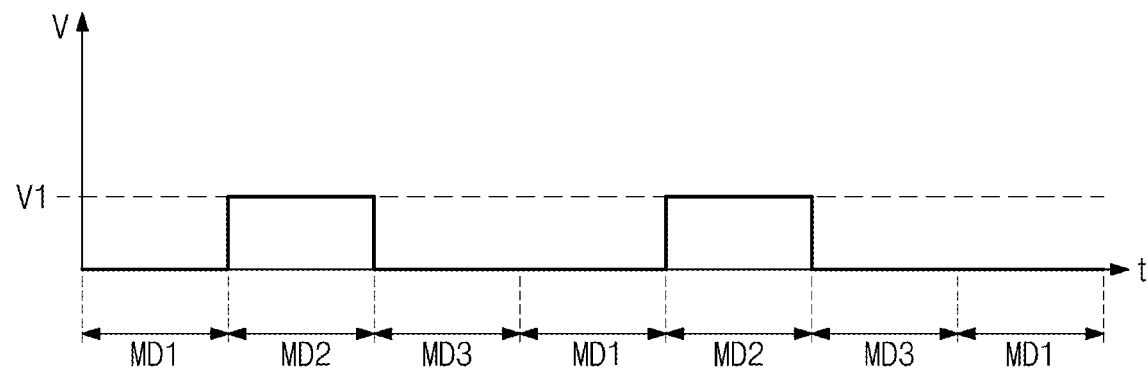
FIG. 11 is a timing diagram of an embodiment of an operation of a blocking part according to modes of an input sensor.

FIG. 11 is a timing diagram of an embodiment of an operation of a blocking part according to modes of an input sensor.

For example, referring to FIGS. 5 and 11, the input sensor IS may operate in a first mode MD1, a second mode MD2, and a third mode MD3. The first mode MD1, the second mode MD2, and the third mode MD3 may operate in order according to time t. The first mode MD1, the second mode MD2, and the third mode MD3 may operate for the same time period. However, this is an example, and the operation time of the first mode MD1, the second mode MD2, and the third mode MD3 is not limited thereto. For example, the operation time of the first mode MD1, the second mode MD2, and the third mode MD3 may be different from each other.

The first mode MD1 and the second mode MD2 are the same as the first mode and the second mode described in the embodiment shown in FIG. 5.

In the first mode MD1, the blocking part BK may be floated. However, this is an example and the state of the blocking part BK is not limited thereto. For example, the blocking part BK may receive a ground voltage in the first mode MD1.

In the second mode MD2, a compensation voltage V1 may be provided to the blocking part BK. The compensation voltage V1 may have a value substantially the same as the sensing signal.

The third mode MD3 may be a mode after the second mode MD2. The input sensor IS may operate back in the first mode MD1 after the third mode MD3. The third mode MD3 may be a waiting mode on standby for the next operation, and the third mode MD3 may be omitted.

According to the embodiments, the blocking part BK may be disposed on the plurality of sensing wirings TL1, TL2, and TL3. A sensing signal identical to the plurality of first sensing electrodes TE1 and the plurality of second sensing electrodes TE2 may be provided to the plurality of sensing wirings TL1, TL2, and TL3. A compensation voltage V1 may be provided to the blocking part BK. The sensing signal and the compensation voltage V1 may substantially have the same value. Accordingly, parasitic capacitance may not be generated between the blocking part BK and the plurality of sensing wirings TL1, TL2, and TL3. When the sensing pen PN (see FIG. 1) is sensed in the active area AA-I, signal distortion generated by the parasitic capacitance may be prevented. Accordingly, a display device EA (see FIG. 1) having improved sensing reliability in the active area AA-I may be provided.

Figure 12:
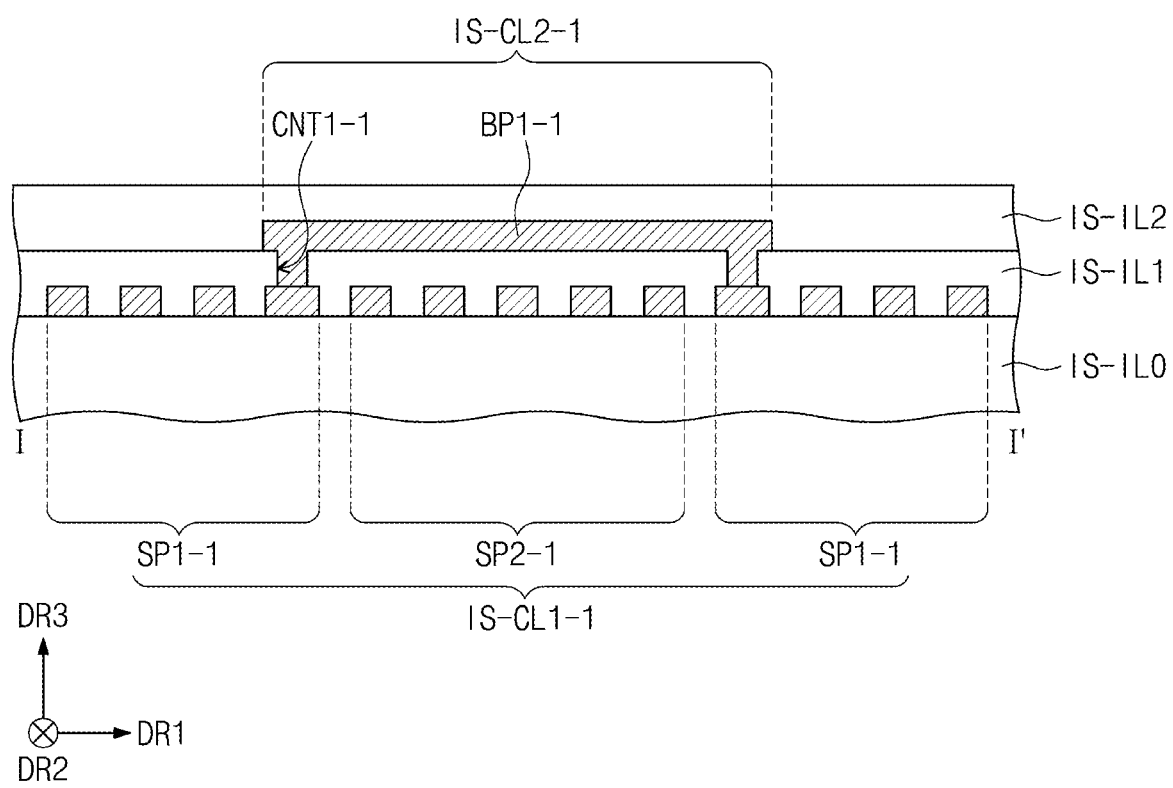
FIG. 12 is a cross-sectional view of another embodiment of a portion of the input sensor taken along a line corresponding to I-I' of FIG. 5.
Figure 13:
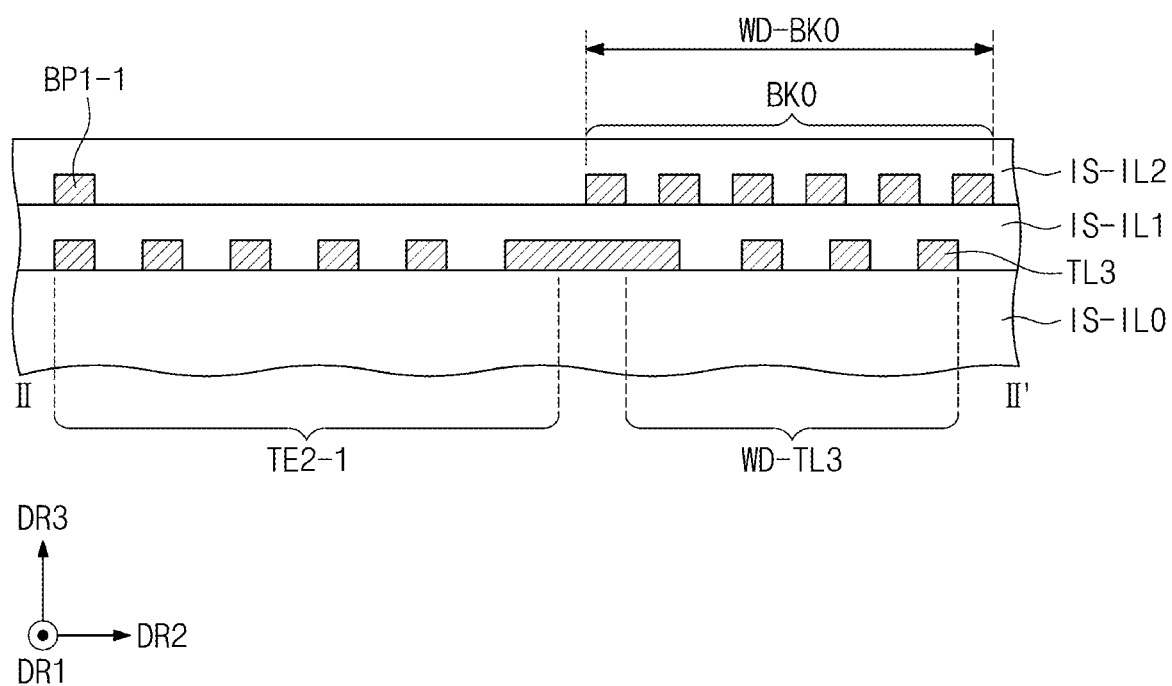
FIG. 13 is a cross-sectional view of another embodiment of a portion of the input sensor taken along a line corresponding to II-II' of FIG. 5.

FIG. 12 is a cross-sectional view of another embodiment of a portion of the input sensor taken along a line corresponding to I-I' of FIG. 5, and FIG. 13 is a cross-sectional view of another embodiment of a portion of the input sensor taken along a line corresponding to II-II' of FIG. 5. In describing FIGS. 12 and 13, like reference numerals are applied to the components described in FIGS. 6 and 7, and a repetitive description will be omitted to avoid redundancy.

Referring to FIGS. 12 and 13, a sensing circuit layer ML-T (see FIG. 3B) may be disposed on the base insulating layer IS-IL0. The sensing circuit layer ML-T (see FIG. 3B) may include a first conductive layer IS-CL1-1, a first insulating layer IS-IL1, a second conductive layer IS-CL2-1, and a second insulating layer IS-IL2. Specifically, referring to FIG. 12, the first conductive layer IS-CL1-1 may include a plurality of sensing patterns SP1-1 and SP2-1, and the second conductive layer IS-CL2-1 may include a plurality of bridge patterns BP1-1.

When viewed on a plan, the first conductive layer IS-CL1-1 may have a mesh pattern.

Referring to FIG. 13, the plurality of second sensing electrodes TE2-1 and the plurality of third sensing wirings TL3 may be formed through the same process to include the same material and have the same stacking structure. The plurality of bridge patterns BP1-1 and a blocking part BK0 may be formed through the same process to include the same material and have the same stacking structure.

According to the embodiments, the blocking part BK0 may be formed simultaneously while a plurality of bridge patterns BP1-1 are formed. Accordingly, a display device EA (see FIG. 1) having a simplified process may be provided. In addition, the widths WD-BK1, WD-BK2, and WD-BK3 (see FIG. 5) of the plurality of sensing wirings TL1, TL2, and TL3 (see FIG. 5) are smaller than the width WD-BK0 of the blocking part BK0. When viewed on a plan, the blocking part BK0 may cover a plurality of third sensing wirings TL3. The blocking part BK0 may block static electricity generated by the sensing pen PN (see FIG. 1). The blocking part BK0 may prevent an electric field from being generated between the sensing pen PN (see FIG. 1) and the plurality of sensing wirings TL1, TL2, and TL3 (see FIG. 5). The blocking part BK0 may prevent jitter from being generated between the sensing pen PN (see FIG. 1) and the plurality of sensing wirings TL1, TL2, and TL3 (see FIG. 5). The blocking part BK0 may prevent a signal transmitted through the plurality of sensing wirings TL1, TL2, and TL3 (see FIG. 5) from being distorted by the sensing pen PN (see FIG. 1). Accordingly, a display device EA (see FIG. 1) having reduced noise may be provided, and a display device EA (see FIG. 1) having improved sensing reliability at the boundaries of the active area AA-I (see FIG. 5) and the peripheral area NAA-I (see FIG. 5) may be provided.

Figure 14:
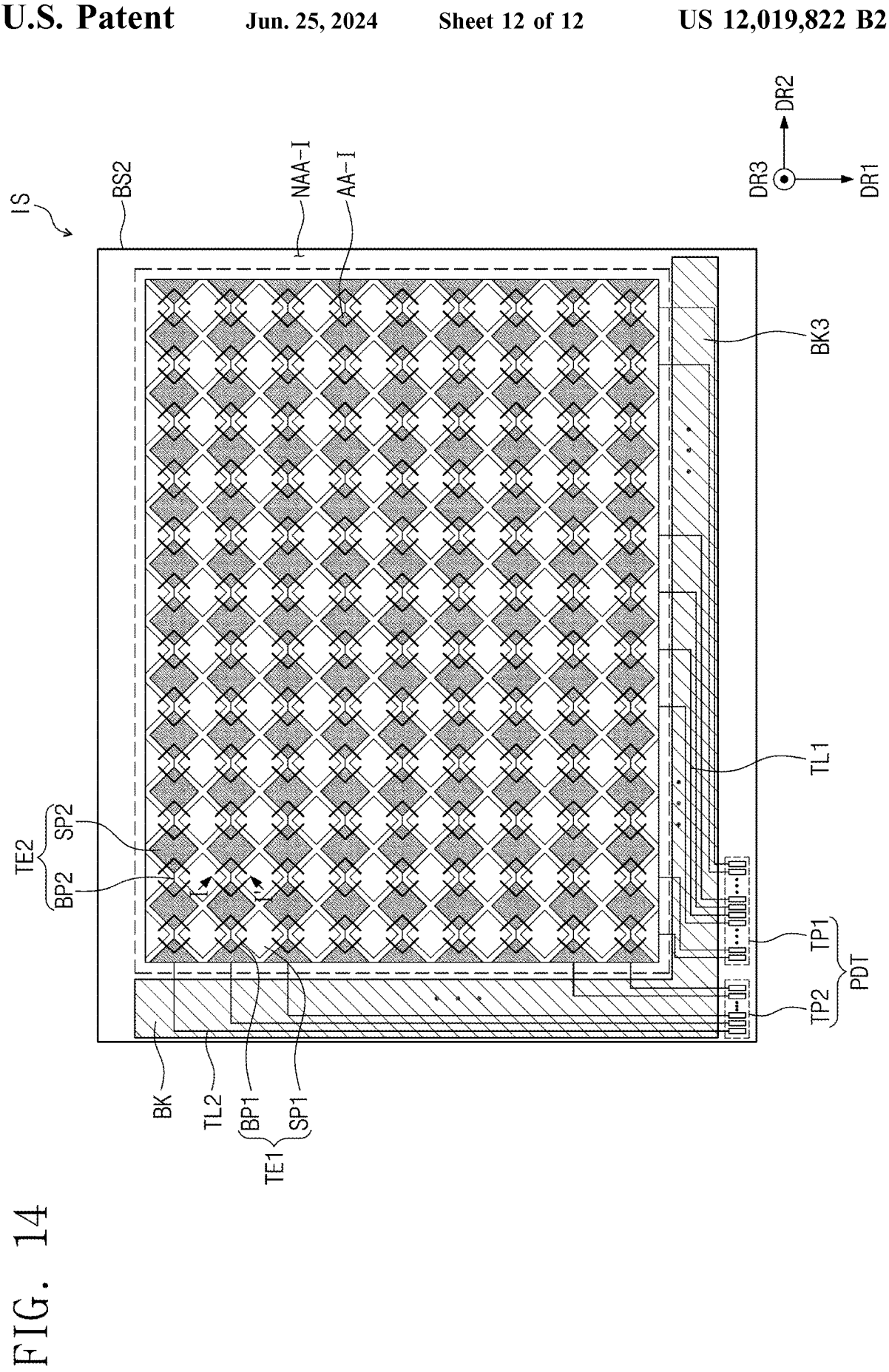
FIG. 14 is a plan view of a fourth embodiment of an input sensor shown in FIG. 2.

FIG. 14 is a plan view of a fourth embodiment of an input sensor shown in FIG. 2. In describing FIG. 14, like reference numerals are applied to the components described in FIG. 5, and a repetitive description will be omitted to avoid redundancy.

Referring to FIG. 14, a plurality of sensing wirings TL1-1 and TL2-1 may be disposed in the peripheral area NAA-I. The plurality of sensing wirings TL1-1 and TL2-1 may include a plurality of first sensing wirings TL1-1 and a plurality of second sensing wirings TL2-1.

A blocking part BK-3 may be disposed on the plurality of sensing wirings TL1-1 and TL2-1. The blocking part BK-3 may cover the plurality of sensing wirings TL1-1 and TL2-1.

The plurality of first sensing wirings TL1-1 may be connected to one end of the plurality of first sensing electrodes TE1, respectively. The plurality of second sensing wirings TL2-1 may be connected to one end of the plurality of second sensing electrodes TE2, respectively.

The plurality of sensing wirings TL1-1 and TL2-1 may not be disposed in the peripheral area NAA-I facing the other end of the plurality of first sensing electrodes TE1 and the other end of the plurality of second sensing electrodes TE2. Accordingly, an input sensor IS-3 may provide a display device EA (see FIG. 1) having a reduced area of the peripheral area NAA-I.

According to the embodiments, a blocking part may be disposed on a plurality of sensing wirings. The blocking part may prevent an electric field from being generated between a sensing pen and the plurality of sensing wirings. The blocking part may prevent a signal transmitted through the plurality of sensing wirings from being distorted by the sensing pen. Therefore, a display device having improved sensing reliability may be provided.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
a display panel; and
an input sensor disposed on the display panel,
wherein the input sensor comprises:
a plurality of sensing electrodes;
a plurality of sensing wirings electrically connected to the plurality of sensing electrodes respectively; and
a conductive part having a single, contiguous, open shape covering the plurality of sensing wirings without overlapping the plurality of sensing electrodes,
wherein the conductive part is configured to be floated or to receive a substantially constant voltage.

2. The display device of claim 1, wherein the conductive part comprises a "C-shape" including a shielding layer having a mesh pattern.

3. The display device of claim 1, wherein:
a plurality of openings are defined in the conductive part; and
the plurality of openings are spaced apart in a first direction, and the plurality of openings extend in a second direction intersecting the first direction, respectively.

4. The display device of claim 3, wherein each of the plurality of openings has a width greater than a width of each of the plurality of sensing wirings.

5. The display device of claim 1, further comprising a controller to receive a signal from the input sensor and to remove the signal when the signal has a shape different from a shape of a Gaussian distribution.

6. The display device of claim 1, wherein the substantially constant voltage is a ground voltage.

7. The display device of claim 1, wherein the substantially constant voltage is substantially the same as a voltage provided to the plurality of sensing electrodes.

8. The display device of claim 1, wherein in a second mode, the plurality of sensing wirings and the conductive part are configured to receive substantially the same voltage.

9. The display device of claim 1, wherein:
the plurality of sensing electrodes comprise a plurality of sensing patterns and a bridge pattern disposed on a layer different from the plurality of sensing patterns; and
the plurality of sensing wirings are disposed on the same layer as any one of the plurality of sensing patterns or the bridge pattern, and the conductive part is disposed on the same layer as the other of the plurality of sensing patterns or the bridge pattern.

10. The display device of claim 1, wherein the plurality of sensing electrodes comprises a plurality of first sensing electrodes and a plurality of second sensing electrodes,
wherein the input sensor operates in a first mode and a second mode different from the first mode,
wherein in the first mode, the plurality of first sensing electrodes is configured to output sensing signals and the plurality of second sensing electrodes is configured to receive driving signals, and
in the second mode, the plurality of first and second sensing electrodes are configured to receive the same substantially constant voltage.

11. The display device of claim 1, wherein the conductive part has a width in a first direction greater than a width of a wiring region in the first direction where the plurality of sensing wirings extending in a second direction intersecting the first direction is disposed.

12. The display device of claim 11, wherein an area of the conductive part is larger than an area of the wiring region.

13. A display device comprising:
a display panel;
a plurality of sensing electrodes disposed on the display panel;
a plurality of sensing wirings electrically connected to the plurality of sensing electrodes, respectively; and
a conductive part having a single, contiguous, open shape disposed on the plurality of sensing wirings without overlapping the plurality of sensing electrodes and having a width in a first direction greater than a width of a wiring region in the first direction where the plurality of sensing wirings is disposed,
wherein the plurality of sensing electrodes comprises a sensing pattern and a bridge pattern disposed on a different layer from the sensing pattern, the plurality of sensing wirings is disposed on the same layer as the bridge pattern, and the conductive part is disposed on the same layer as the sensing pattern.

14. The display device of claim 13, wherein the single, contiguous conductive part comprises a "C-shape" configured to be floated or to receive a ground voltage.

15. The display device of claim 13, wherein the conductive part is configured to operate in a first state or a second state different from the first state,
wherein the first state is a state in which the conductive part is configured to be floated or to receive a ground voltage, and
the second state is a state in which the conductive part is configured to receive the same voltage as that applied to the plurality of sensing wirings.

16. The display device of claim 13, wherein the single, contiguous conductive part comprises a shielding layer having a mesh pattern.

17. The display device of claim 13, wherein:
a plurality of openings is formed in the single, contiguous conductive part;
the plurality of openings is spaced apart in a first direction, and the plurality of openings each extend in a second direction intersecting the first direction; and
each of the plurality of openings has a width greater than a width of each of the plurality of sensing wirings.

* * * * *